United States Patent [19]

Wolf

[11] Patent Number: 4,843,386

[45] Date of Patent: Jun. 27, 1989

[54] REMOTE CONTROL UNIT WITH HIERARCHICAL SELECTION

[75] Inventor: Johann Wolf, Pentling, Fed. Rep. of Germany

[73] Assignee: Siemens Aktiengesellschaft, Berlin & Munich, Fed. Rep. of Germany

[21] Appl. No.: 47,890

[22] Filed: May 8, 1987

[30] Foreign Application Priority Data

Dec. 5, 1986 [DE] Fed. Rep. of Germany ....... 3615953

[51] Int. Cl.[4] ........................ H04Q 7/00; H04Q 9/00; H04B 1/20

[52] U.S. Cl. ...................... 340/825.690; 340/825.060; 340/825.720

[58] Field of Search .............. 340/712, 825.31, 825.69, 340/825.72, 825.22, 825.56, 825.06, 825.17; 315/316, 323; 358/194.1

[56] References Cited

U.S. PATENT DOCUMENTS

| | | | |
|---|---|---|---|
| 3,522,588 | 8/1970 | Clarke, Jr. et al. | 340/825.06 |
| 4,608,628 | 8/1986 | Saito et al. | 340/825.17 |
| 4,697,231 | 9/1987 | Boytor et al. | 340/712 |
| 4,712,105 | 12/1987 | Kohler | 358/194.1 |
| 4,728,949 | 3/1988 | Platte et al. | 340/825.69 |
| 4,760,393 | 7/1988 | Mauch | 340/825.56 |

FOREIGN PATENT DOCUMENTS

| | | | |
|---|---|---|---|
| 120345 | 10/1984 | European Pat. Off. . | |
| 129286 | 12/1984 | European Pat. Off. . | |
| 3418053 | 11/1984 | Fed. Rep. of Germany . | |
| 0050889 | 3/1983 | Japan | 340/825.72 |
| 0153484 | 9/1983 | Japan | 340/825.72 |
| 8300780 | 3/1983 | World Int. Prop. O. . | |

*Primary Examiner*—Donald J. Yusko
*Attorney, Agent, or Firm*—Kenyon & Kenyon

[57] ABSTRACT

In a remote control unit for modifying the operating states of physically spaced operating units such as the volume control of a stereo system, the color control of a television set and the brightness control of a lighting fixture, a first key is actuated to call up in a predetermined sequence the different floors of a building in which the operating devices are disposed. The floors are identified on a display as they are called up. Upon, actuation of a second key, further actuation of the first key calls up the different rooms on the last-displayed floor of the building, the rooms being identified on the display. Upon another actuation of the second key, yet further actuation of the first key calls up the operating devices or units disposed within the last room called up by actuating the first key. A reset key is provided for returning to the first member of the uppermost hierarchical grouping (i.e., the first-displayed floor). Other keys are provided on the remote control unit for modifying the operating state of a device selected by actuation of the first two keys.

17 Claims, 2 Drawing Sheets

REMOTE CONTROL UNIT WITH HIERARCHICAL SELECTION

BACKGROUND OF THE INVENTION

This invention relates to a remote control unit or station. More particularly, this invention relates to such a unit for modifying the operating state of a selected one of a plurality of electronic or electrical operating units via wireless signal transmission.

Devices for the remote control of electronic or electrical equipment such as television sets, stereo systems and lighting fixtures or lamps are well known. Such remote control devices are generally portable and provided with manually actuatable keys. Inasmuch as only a relatively small surface area is available on a remote control unit, the scope of operation of the unit generally cannot be shown and explained sufficiently on the unit itself. Moreover, users are not accustomed to reading pertinent operating instructions and, in addition, the instructions are frequently not at hand in practice.

Because of an increasing number of channels for different operating units and a multiplicity of addresses, i.e., equipment or operating units to be addressed and controlled, a user can easily lose track of which operating unit is subject at any particular instant to control by the remote unit.

Conventional remote control units are generally incapable of being adapted to an increasing number of operating units for the reason that the number of operating units for the particular control unit is usually fixed.

An object of the present invention is to provide an improved remote control unit of the above-mentioned type.

Another, more particular, object of the present invention is to provide such a remote control unit whose operation is simplified particularly with respect to the selection of a piece of equipment to be controlled at any particular moment.

Another particular object of the present invention is to provide such a remote control unit which has a minimal number of keys.

Yet another object of the present invention is to provide such a remote control unit which is easily adapted to different numbers of operating units.

SUMMARY OF THE INVENTION

A remote control unit for a system having a multiplicity of physically spaced operating units organizable into respective groups comprises, in accordance with the present invention, a wireless transmitter for sending signals to the operating units, a keyboard with a plurality of manually actuatable control keys, and a selection device for selecting which of the operating units is to be subject to a control operation. A control component responsive to the control keys and to the selection device generates, in response to signals from the control keys, control signals for modifying the operating state of one of the operating units selected in accordance with signals from the selection device. The control component is operatively connected to the transmitter for transmitting the control signals to the selected operating unit via the transmitter. The selection device includes a sequencing key operatively coupled to the control component for calling up in a predetermined first sequence the different groups of the operating units and, alternately, in a predetermined second sequence the different operating units in a selected group of the operating units. The selection device further comprises a manually actuatable stop key operatively coupled to the control component for shifting the effect of actuating the sequencing key from the first sequence to the second sequence.

Pursuant to the present invention, the operating units are organized into categories of different hierarchical levels. Accordingly, groups of operating units may themselves be organized into respective supergroupings. The sequencing key of the selection device is used for calling up in a predetermined sequence in the control unit the different members of each hierarchical ordered space or category. Upon the calling up of a desired member of an ordered space or category, the stop button is pushed. At that time further actuation of the sequencing key calls up the members of the next lower hierarchical ordered space in a predetermined sequence. Upon the calling up a desired member of the second hierarchical ordered space, the stop button again pushed, whereby that desired member is selected. Further actuation of the sequencing key then calls up in another predetermined sequence the various members of the selected member of the second hierarchical space.

As an example, the operating units may include the controls of television sets, stereo systems, electric lights and climate regulation systems. These operating units are organized into respective groups such as the rooms in which the operating units are located. The groups, i.e.. rooms, are in turn organized into respective supergroupings such as the floors on which the rooms are located. Actuating the sequencing key initially calls up sequences the floors of the building. Upon actuation of the stop key, further actuations of the sequencing key call up the different rooms on the selected floor. When the desired floor has been called up, the stop button is again actuated. At that time further actuations of the sequencing key calls up, in a predetermined sequence, the various devices or operating units located in the selected room which are subject to control by the remote unit.

Preferably, the selection device of a remote control unit pursuant to the invention further includes a reset key operatively coupled to the control component for shifting the effect of actuating the sequencing key back to an uppermost hierarchical grouping.

The control keys of the remote unit preferably include an ON key and an OFF key, as well as one or more keys for modifying an operational parameter of the operating units. Such a key may, for example, serve to dim a light or to turn up the volume of a stereo system.

The remote control unit advantageously includes a display component coupled to the control component for displaying the operating state of an operating unit identified by the selection device. To this end, the remote unit includes a receiver component for receiving state messages from the operating units via a wireless medium. The visual display of the operating states of the operating units is advantageous particularly if the operating states of the operating units are not determinable upon visual inspection, e.g., if the operating devices themselves are not within visual range of an operator.

If the remote control unit can process specific signals which identify ordered spaces, the manual operations for the selection of an operating unit to be controlled can be simplified. For example, if a person equipped with the remote control unit enters a given space such as a room, the control component of the remote control unit would then assume that only the operating units within the particular room are available for selection without a separate preselection operation. Otherwise, especially if a visual inspection is impossible, and if a suitable transmission medium or a transmission chain is being used, first a particular building and then a given floor and finally certain rooms on that floor can be selected and identified on the display of the remote control unit.

Advantageously, the control component of the remote unit processes signals for the identification of the ordered spaces not only to the end of determining the states of the operating units but also to simplify the commands for modifying the operating states of the operating units in a given ordered space. For example, if only one addressable operating unit is present in a given room of a building, that operating unit (e.g., a lighting fixture) can be controlled in the respective room directly by the remote unit without a preceding selection operation.

DETAILED DESCRIPTION

Figure 2:
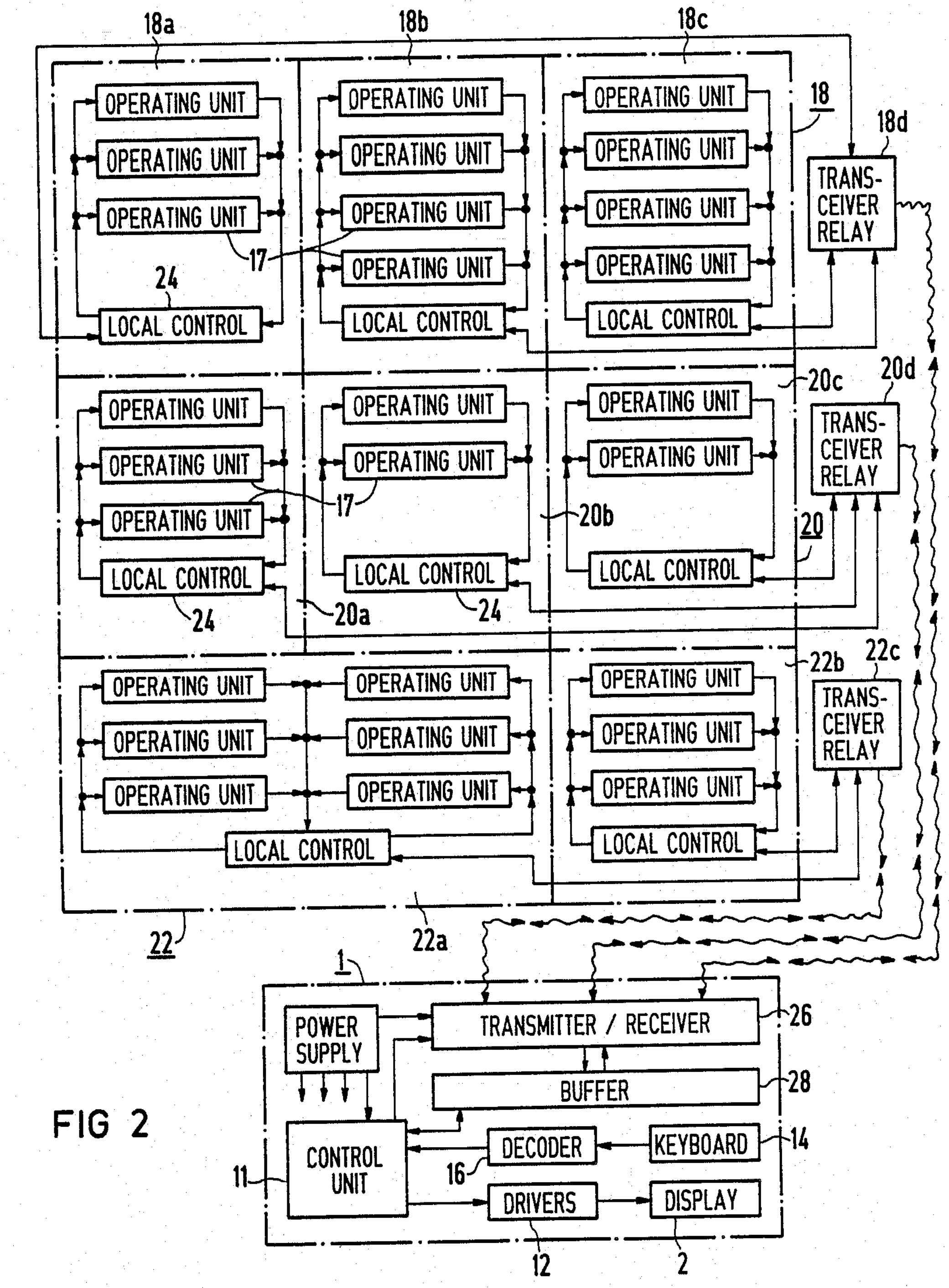
FIG. 2 is a block diagram of the remote control unit of FIG. 1 and of an assemblage of operating units controllable by the remote control unit.

A remote control unit or station 1 pursuant to the invention can be constructed as a portable transmitter or as a wired unit housed in a concealed box in a building. Remote control unit 1 has a programmable control component 11 (FIG. 2) which is operatively connected to a visually readable display 2 via driving circuits 12. The remote unit is provided with a keyboard 14 including a sequencing or "continue" key 3, a "stop" key 4 and a reset key 5. As shown in FIG. 2, keyboard 14 is operatively connected to control component 11 via a decoder 16.

As depicted in FIG. 2, a multiplicity of operating units to be operated by the remote control unit 1 are organized into respective groups *18a*, *18b*, *18c*, *20a*, *20b*, *20c*, *22a* and *22b*. The groups of operating units are in turn organize respective supergroupings 18, 20 and 22. Each operating unit represents exemplarily a modifiable control parameter of an electrical or electronic device. Accordingly, operating units 17 may include the volume control of a stereo system, the color control of a television set, and the brightness control of a light fixture.

Each group *18a*, *18b*, *18c*, *20a*, *20b*, *20c*, *22a* and *22b* of operating units 17 may be provided with a respective local control 24 which is connected wirelessly or via input and output leads to the respective operating units 17. The local controls in any supergrouping 18, 20 and 22 are also connected to a respective transceiver device *18d*, *20d* and *22c* acting as a relay transmitting to a transmitter/receiver 26 in remote unit 1 signals coding the operating states of the respective operating units 17. Transceivers *18d*, *20d* and *22c* also receive command signals from control component 11 via a buffer 28 and transmitter/receiver 26 and relay those command signals to the various operating units 17 via local controls 24.

An initial actuation of sequencing key 3 calls up via control component 11 a first member of an uppermost hierarchical grouping or ordered space of operating units 17. Further actuation of sequencing key 3 calls up, in a predetermined sequence, the other members of the uppermost hierarchical grouping. Actuation of stop key 4 effects a selection of the member of the uppermost hierarchical grouping shown on display 2 at the instant stop key 4 is actuated. At that point, continued operation of the sequencing key calls up in another predetermined sequence the members of the selected grouping, that grouping representing a next lower hierarchical category or ordered space.

By way of example, an initial actuation of sequencing key 3 calls up a first supergrouping 18, while a second actuation calls up supergrouping 20. If stop key 4 is then actuated, subsequent actuations of sequencing key 3 results in a calling up of groups *20a*, *20b* and *20c* in that predetermined order. If, however, stop key 4 is pressed immediately after the calling up of group *20a* and prior to the calling up of group *20b*, a subsequent actuation of key 3 results in the sequential calling up and concomitant display of the identities of the operating units within group *20a*.

The groups of operating units may correspond to respective rooms on a floor of a given building, while the supergroupings of the groups in turn represent different floors in that building. A person using a remote control unit pursuant to the present invention first calls up the different floors in the building, then the different rooms on a selected floor and finally the different controllable devices within a selected room.

Figure 1:
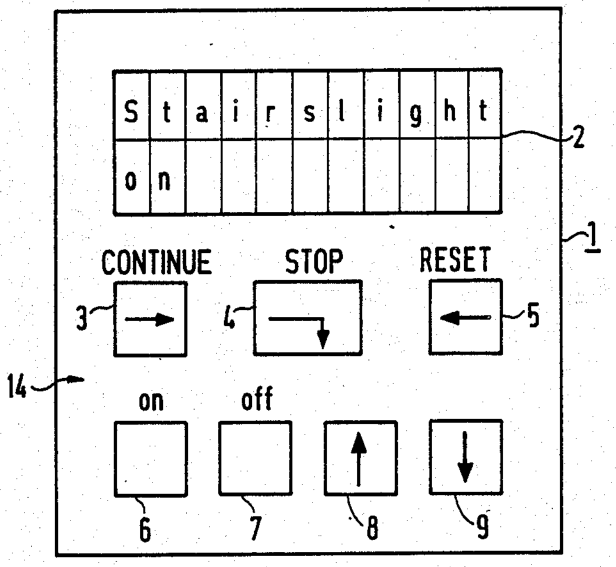
FIG. 1 is a schematic plan view of a remote control unit in accordance with the present invention.

Actuation of reset key 5 (FIG. 1) results in a return of the addressing operation to the first member of the uppermost hierarchical grouping or space.

Upon the selection of an operating unit or device via keys 3 and 4, an operator may turn the selected device on by depressing a control pushbutton or key 6. Similarly, a device may be switched off by depressing another control pushbutton or key 7. Two further keys 8 and 9 are provided for respectively increasing or decreasing a control parameter of the selected operating device.

Display 2 identifies the operating unit called up by the actuation of keys 3 and 4 (see FIG. 1) and also indicates the operating state of the addressed device. If, for example, a staircase light has been selected for control, the words "stairs light" or other similar appellation appears on display 2. Upon an actuation of key 6, the word "on" also appears on the display. The brightness of the staircase light can be increased by pushing key 8 and decreased by pushing key 9.

A structured hierarchical grouping of the various operating units is advantageous but not necessary. Accordingly, the operating units 17 can be called up in a single sequence.

The use of a remote control unit in accordance with the present invention enables a retrofit, i.e., an accommodation of the control unit to include further operating devices or to omit other devices. The adaptability of the remote control unit is based in part on the programmable nature of control component 11. A hard-wired remote unit would result in redundancy and non-utilized channels. In such a hard-wired control device, expansion, i.e., an attempt to accomodate further operating units, generally interferes with the completed structure because insufficient free function keys are provided.

Signals are transmitted between transmitter/receiver 26 and transceiver relays **18*b*, 20*d* and 22*c*** via electromagnetic waves or another wireless medium. Radio or infrared wavelengths may be particularly advantageous.

It is to be noted that the grouping of operating units illustrated in FIG. 2 and the chains of relay stations is exemplary of the invention and should not be construed to limit the scope of the claims herein. Other structures or arrangements such as direct communication between control unit 1 and operating units 17 are possible.

What is claimed is:

1. A remote control unit for a system having a plurality of remote operating units organized into groups, said control unit comprising:

wireless transmitter means for sending signals to the operating units;

a keyboard including a plurality of manually actuatable control keys;

selection means for selecting which of said operating units is to be subject to a control operation, said selection means comprising hierarchical selection means wherein each activation of a manually actuatable stop key operatively coupled to said hierarchical selection means calls up related and progressively smaller groups of said operating units and wherein each activation of a manually actuatable sequencing key operatively coupled to said hierarchical selection means calls up a predetermined sequence of operating units within each group of operating units; and control means responsive to said control keys for generating, in response to signals from said control keys, control signals for modifying the operating state of one of said operating units selected in accordance with signals from said selection means, said control means being operatively connected to said transmitter means for transmitting said control signals to said one of said operating units via said transmitter means.

2. The remote control unit set forth in claim 1 wherein said selection means further comprises resetting means including a reset key operatively coupled to said control means for shifting the effect of actuating said sequencing key back to an uppermost hierarchical grouping.

3. The remote control unit set forth in claim 2 wherein said uppermost hierarchical grouping consists of the collection of said groups.

4. The remote control unit set forth in claim 1 wherein said control keys include an ON key and an OFF key.

5. The remote control unit set forth in claim 4 wherein said control keys further include a key for modifying an operational parameter of the operating units.

6. The remote control unit set forth in claim 1, further comprising display means operatively coupled to said control means for displaying the operating state of an operating unit identified by said selection means.

7. The remote control unit set forth in claim 6, further comprising wireless receiver means for receiving signals from said operating units indicating the operating states thereof.

8. The remote control unit set forth in claim 1 wherein said control means includes means for processing specific signals for the identification of ordered spaces.

9. The remote control unit set forth in claim 8 wherein said means for processing utilizes said specific signals for simplifying commands for selecting devices in said ordered spaces as to the number of commands associated with the respective ordered spaces.

10. A remote control unit for a system having a multiplicity of physically spaced operating units organizable into respective groups themselves organizable into respective supergroupings, said remote control unit comprising:

wireless transmitter means for sending signals to the operating units;

a keyboard including a plurality of manually actuatable control keys;

selection means for selecting which of said operating units is to be subject to a control operation; and control means responsive to said control keys and to said selection means for generating, in response to signals from said control keys, control signals for modifying the operating state of one of said operating units selected in accordance with signals from said selection means, said control means being operatively connected to said transmitter means for transmitting said control signals to said one of said operating units via said transmitter means, said selection means comprising sequencing means including a manually actuatable sequencing key operatively coupled to said control means for calling up in a predetermined first sequence the different supergroupings of groups of said operating units and, alternately, in a predetermined second sequence, the different groups in a selected supergrouping and, also alternately, in a predetermined third sequence the different operating units in a selected group of said operating units, said selection means further comprising hierarchy shift means including a manually actuatable stop key operatively coupled to said control means for shifting the effect of actuating said sequencing key from said first sequence to said second sequence and from said second sequence to said third sequence.

11. The remote control unit set forth in claim 10 wherein said selection means further comprises resetting means including a reset key operatively coupled to said control means for shifting the effect of acutating said sequencing key back to an uppermost hierarchical grouping.

12. The remote control unit set forth in claim 11 wherein said uppermost hierarchical grouping consists of the collection of said supergroupings.

13. The remote control unit set forth in claim 10 wherein said control keys include an ON key and an OFF key.

14. The remote control unit set forth in claim 13 wherein said control keys further include a key for modifying an operational parameter of the operating units.

15. The remote control unit set forth in claim 10, further comprising display means operatively coupled to said control means for displaying the operating state of an operating unit identified by said selection means.

16. The remote control unit set forth in claim 15, further comprising wireless receiver means for receiving signals from said operating units indicating the operating states thereof.

17. A remote control unit for a system having a multiplicity of physically spaced operating units organizable into respective groups, said control unit comprising:

first selection means for selecting one of said groups;

second selection means for selecting one of the operating units included in said one of said groups;

a plurality of manually actuatable control keys; and control means operatively connected to said first and said second selection means and to said control keys for wirelessly transmitting to said one of said operating units, in response to signals from said selection means and in response to signals from said control keys, a control signal for modifying the operating state of said one of said operating units, said first selection means including a manually actuatable sequencing key operatively coupled to said control means for calling up in a predetermined first sequence the different groups of said operating units, said second selection means including a manually actuatable stop key operatively coupled to said control means for shifting the effect of actuating said sequencing key from said first sequence to said second sequence, said second selection means further including said sequencing key for calling up in a predetermined second sequence the different operating units in a selected group of said operating units.

* * * * *